US011729235B2

(12) United States Patent
Lapointe et al.

(10) Patent No.: US 11,729,235 B2
(45) Date of Patent: *Aug. 15, 2023

(54) SYSTEM AND METHOD FOR SYNCHRONIZING TRANSMISSION OF MEDIA CONTENT USING TIMESTAMPS

(71) Applicant: Grass Valley Canada, Montreal (CA)

(72) Inventors: Jean-Philippe Lapointe, Montreal (CA); Vincent Trussart, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,120

(22) Filed: Mar. 16, 2022

(65) Prior Publication Data

US 2022/0210214 A1 Jun. 30, 2022

Related U.S. Application Data

(63) Continuation of application No. 17/328,918, filed on May 24, 2021, now Pat. No. 11,316,912.

(Continued)

(51) Int. Cl.
*G06F 13/00* (2006.01)
*H04L 65/65* (2022.01)
*H04N 21/8547* (2011.01)
*H04L 65/80* (2022.01)
*H04L 65/70* (2022.01)
*H04L 65/75* (2022.01)

(52) U.S. Cl.
CPC .............. *H04L 65/65* (2022.05); *H04L 65/70* (2022.05); *H04L 65/75* (2022.05); *H04L 65/80* (2013.01); *H04N 21/8547* (2013.01)

(58) Field of Classification Search
CPC ......... H04L 65/65; H04L 65/70; H04L 65/75; H04L 65/80; H04L 65/765; H04N 21/8547; H04N 21/4307; H04N 21/4341; H04N 21/64322
USPC ................ 709/232, 234, 217–219, 231, 247; 713/400; 702/187, 89
See application file for complete search history.

(56) References Cited

U.S. PATENT DOCUMENTS 10,129,587 B2 11/2018 Erickson
10,200,768 B2 2/2019 Niemeyer
(Continued)

*Primary Examiner* — Kenneth R Coulter
(74) *Attorney, Agent, or Firm* — ArentFox Schiff LLP

(57) ABSTRACT

A system and method is provided for synchronizing media content in a media distribution network using timestamps. The system includes a decoder configured to parse a plurality of data packets of a media stream to determine a timestamp value for each video frame in the media stream; and a media content synchronizer. The media content synchronizer generates a media content timeline based on the determined timestamp value of each of video frame, generates the media content timeline based on a cadence having monotonic increasing count, determines whether each video frame of the media stream is a next frame in a video sequence of the media stream based on the timestamp value for the respective video frame, and repeats a previous frame in the video sequence to generate the media content timeline when a current frame in the video sequence was dropped based on the determined timestamp value.

20 Claims, 6 Drawing Sheets

Related U.S. Application Data

(60) Provisional application No. 63/030,154, filed on May 26, 2020.

(56) References Cited

U.S. PATENT DOCUMENTS

| | | |
|---|---|---|
| 11,316,912 B2 * | 4/2022 | Lapointe ................ H04L 65/75 |
| 2016/0029075 A1 | 1/2016 | Erickson |
| 2017/0055045 A1 | 2/2017 | Li |
| 2018/0288499 A1 | 10/2018 | Niemeyer |
| 2021/0021889 A1 | 1/2021 | Yu |

* cited by examiner

SYSTEM AND METHOD FOR SYNCHRONIZING TRANSMISSION OF MEDIA CONTENT USING TIMESTAMPS

CROSS REFERENCE TO RELATED APPLICATIONS

The current application is a continuation of U.S. patent application Ser. No. 17/328,918, filed May 24, 2021, issued on Apr. 26, 2022 as U.S. Pat. No. 11,316,912, and which claims priority to U.S. Patent Provisional Application No. 63/030,154, filed May 26, 2020, the entire contents of which are hereby incorporated by reference.

TECHNICAL FIELD

The system and method disclosed herein relates to data transmission and reception of media content, and, more particularly, to a system and method for synchronizing the transmission of media content in a network using timestamps.

BACKGROUND

Media channels, such as audio and video channels, have long been transmitted using application specific cables. More recently, media signals have been transmitted on computer based networks using protocols, such as unicast or multicast. Unicast is a method of sending packets on a computer network to a single destination. Multicast is a protocol for efficiently sending data streams to multiple receivers at the same time on TCP/IP networks by use of a multicast address.

One technical issue with data transmission is that when media signals are transmitted to a receiver, IP packets in the signal can often be lost due to various connection issues. Over time, the lost packets may lead to synchronization issues between various types of streams. For example, lost packets in streams of video content will effectively offset the frames relative to corresponding audio content. Over time, these lost packets increase the difference between streams, which can lead to the video being out of sync with the audio, i.e., lip sync misalignment.

Currently, there are various systems used to recover lost IP packets and reconstruct original streams, especially for video content. One example is that media networks can allow for redundant media packet streams to be transmitted and received. For example, a transmitter using the SMPTE 2022-7 communication standard duplicates the input stream and sends it via two different paths to the destination receiver. Using the SMPTE 2022-7 standard, a transmitter continually processes the primary media packet input stream, duplicates the stream, and transmits it via the network over two separate paths in the network (or two or more separate networks, for example). The receiver combines the streams from both paths and reconstructs the original stream. Thus, the first path provides a primary data flow and the second path provides a redundant data flow. If a packet is lost in the first path, the receiver is configured to take the packet from the second path for redundancy.

Network redundancy is an effective way to efficiently transmit a data stream to a receiving device while minimizing potential loss of IP packets. However, there are certain drawbacks from network redundancy, most notably, the doubling of the total bandwidth usage as the media streams (primary and redundant) are transmitted over the networks.

Accordingly, a system and method is needed for transmitting media streams over a network that experiences data packet loss, while also efficiently minimizing bandwidth consumption.

SUMMARY OF THE INVENTION

Thus, in an exemplary embodiment, a system is provided for synchronizing media content in a media distribution network using timestamps. In this aspect, the system includes a content generating device configured to generate and transmit a media stream in the media distribution network, with the media stream comprising a plurality of Internet Protocol (IP) packets comprising a plurality of video frames and real-time transport protocol ("RTP") header information; a decoder configured to parse each IP packet of the video frame of the media stream and determine a presentation timestamp (PTS) value for each frame from an RTP packet parsed from the RTP header information; a media content synchronizer configured to generate a media content timeline based on the determined PTS value of each video frame in the media stream; and a production switcher configured to generate a media content production by synchronizing the video frames of the media stream with corresponding audio content based on the generated media content timeline.

Moreover, according to an exemplary aspect, the media content synchronizer is configured to generate the media content timeline based on a cadence having monotonic increasing count that is derive from a time reference of the media distribution network. Furthermore, the media content synchronizer is configured to determine whether each video frame of the media stream is a next frame in a video sequence of the media stream based on the PTS value for the respective video frame. Furthermore, the media content synchronizer is also configured to repeat a previous frame in the video sequence to generate the media content timeline when the media content synchronizer determines that a current frame in the video sequence was dropped based on the determined PTS value for each frame when the content generating device transmitted the media stream in the media distribution network. Finally, the media content synchronizer is configured to resample the corresponding audio content at a rate to be synchronized to the cadence of the media content timeline, such that the audio content is aligned with the video sequence.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and form a part of this specification, illustrate one or more example aspects of the present disclosure and, together with the detailed description, serve to explain their principles and implementations.

DETAILED DESCRIPTION

Figure 1:
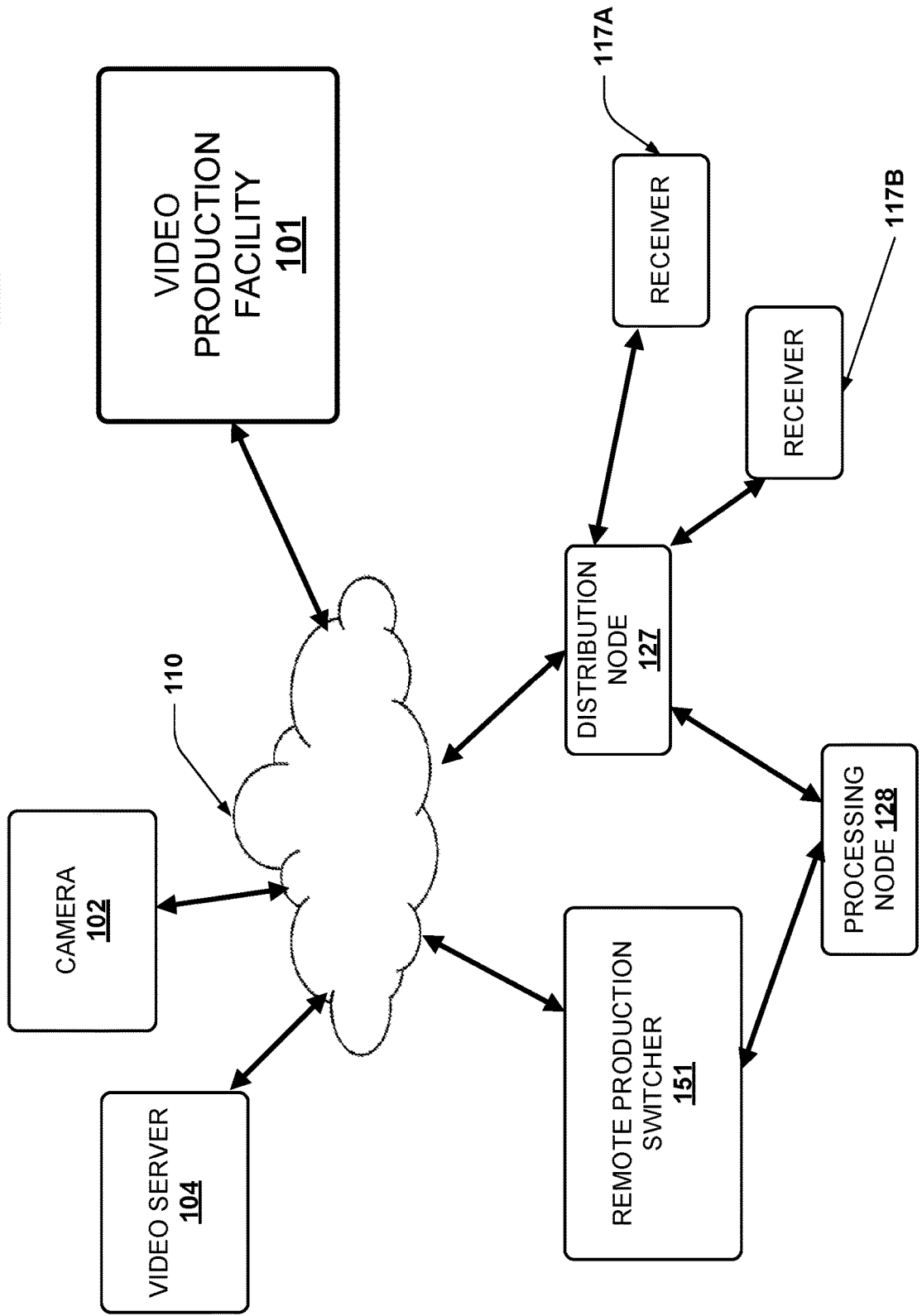
FIG. 1 illustrates a block diagram of a system for synchronizing the transmission of media content in a network using timestamps according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the system and method for synchronizing the transmission of media content in a network using timestamps will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a system 100 for synchronizing the transmission of media content in a network using timestamps according to an exemplary embodiment. In general, the exemplary system includes a video production facility 101 that is configured to receive IP media streams (e.g., including data packets of video and/or audio content and/or ancillary content) and synchronize the media streams for media production using a media stream synchronizer, the details and configuration of which will be described in below. In one aspect, the media content is referred to as "essence", which denotes media that can be consumed by a user (e.g., a video clip, an audio clip, and/or ancillary data such as captions). The premise of the media stream synchronizer is to use timestamps to order and synchronize the media essence where an IP packet (e.g., video or audio content) has been lost, or in some cases added, during transmission to the video production facility 101.

FIG. 1 generally illustrates media distribution system 100 that includes exemplary components included for a media production, starting with the original content generation all the way to consumption by end user devices. As shown, the media distribution system 100 includes the video production facility 101, remote camera 102, remote video server 104, remote distribution node 127, processing node 128, remote production facility 151, and receivers 117A and 117B. In an exemplary aspect, the media distribution system 100 can be considered a media network for production (e.g., real-time media production) and broadcasting of video and audio content. As such, the media distribution system 100 can include a communication network, such as the Internet 103, and/or hardware conducive to internet protocol (IP). That is, the media distribution system 100 can be comprised of a network of network servers and network devices configured to transmit and receive video and audio signals of various formats. It should also be appreciated that one or more over the media distribution system 100 can be implemented on a cloud computing platform, for example.

In an exemplary aspect, the video production facility 101 is configured to receive video and audio signals of various formats. The details of the video production facility 101 will be described below, but in general, the video production facility 101 can be configured as a production setup for a broadcast entity and that utilizes the one or more distribution nodes 127 (e.g., electronic devices) that are configured to distribute media content to one or more remote media devices, such as receivers 117A and 117B, which can be content consuming devices, such as computers, televisions or the like, for example. Moreover, while only two receivers 117A and 117B are shown, the media production network can include a multitude of content consuming devices configured to receive and consume (e.g., playout) the media content as would be appreciated to one skilled in the art.

As noted above, the video production facility 101 is configured to receive media streams from a plurality of content generating devices. Camera 102 and video server 104 are two exemplary devices configured to generate and/or store media content that can be transmitted to video production facility 101 on a push or pull basis. According to an exemplary aspect, remote camera 102 and remote video server 104 can be IP devices that are configured for the transmitting the A/V feed (e.g., the media essence) to the video production facility 101 to use IP over an Ethernet connection, for example. In operation, the remote camera 102 captures video content and generates IP packets with header information that indicates the timing when the video frames were capture. Moreover, video content can typically be captured at a variable frame rate.

According to an exemplary embodiment, remote camera 102 (for example) is configured to transmit the captured media essence as a compressed media stream according to the H.264 compression standard, for example. More particularly, the remote camera 102 can include a codec that uses a profile to encode the captured video before it is transmitted to the video production facility 101. In turn, the video production facility 101 will include a decoder (discussed in more detail below) that is configured to decode the compressed video according to the profile. The profile specifies the encoding techniques and algorithms be used to create the bit-stream of the video content. In one example, the remote camera can be configured to compress the video data using the "Baseline" profile of the H.264 compression standard, which is a simple profile, does not allow the use of B-frames or CABAC entropy encoding, as discussed in more detail below.

As further shown, the system 100 may include remote production switcher 151 and processing node 128 as exemplary components of the media distribution network. Remote production facility 151 can include some or all of the same components of video production facility 101. Moreover, remote production facility 151 may exchange transmissions with the video production facility 101 across the Internet 103. Aspects of implementing the remote production facility 151 may include a live production setup on location at a sports or entertainment venue, where multiple remote cameras 102 and audio recorders may feed captured content through controllers at the remote production facility 151 and are fed to video production facility 101 for media content processing, distribution and/or broadcasting across the network. It should be appreciated that the technique enables overall orchestration of activity for a number of processing events that are distributed across a number of processing nodes as shown in system 100, for example. Moreover, processing node 128 may be an exemplary of an additional media distribution component (e.g., video router or switcher) that is configured to process content (e.g., mixing, keying or the like) content from remote production facility 151 to distribution node 127.

Figure 2:
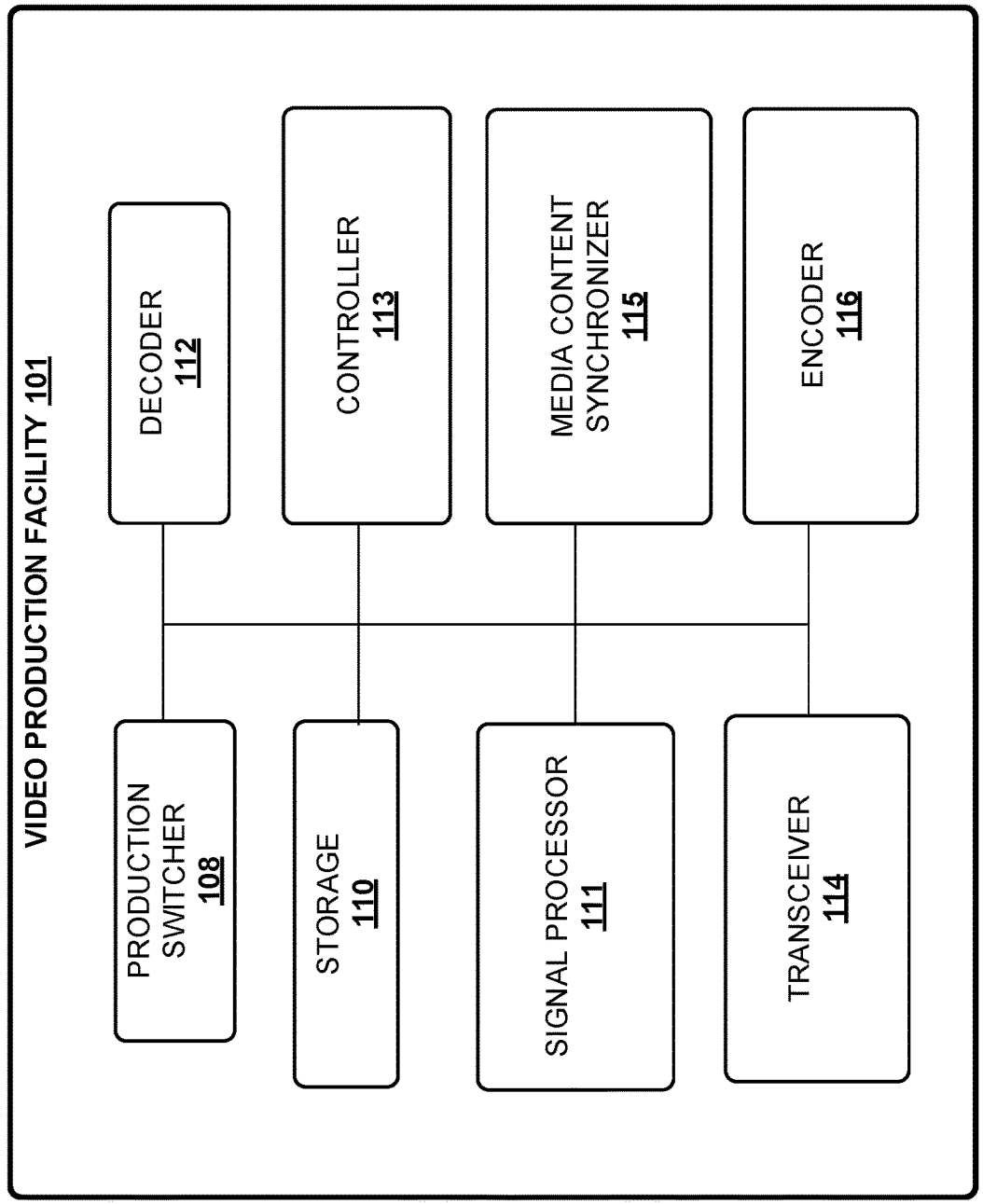
FIG. 2 illustrates a block diagram of the video production facility shown in FIG. 1 for synchronizing the transmission of media content in a network using timestamps according to an exemplary embodiment.

FIG. 2 illustrates a block diagram of the video production facility 101 shown in FIG. 1 for synchronizing the transmission of media content in a network using timestamps according to an exemplary embodiment. As shown, the video production facility 101 can include production switcher 108, storage 110, signal processor 111, decoder 112, controller 113, transceiver 114, media content synchronizer 115, and encoder 116. As noted above, video production facility 101 can be a production setup configured to distribute media content to one or more distribution nodes (e.g., remote media devices 117A and 117B as shown in FIG. 1).

In general, each component of the video production facility 101 can be implemented as a hardware device and/or combination of software applications. For example, media content synchronizer 115 can be implemented as one or more modules configured to perform the algorithms described herein. Moreover, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to an exemplary aspect, production switcher 108 is a distribution node for the media processing network and may process over 100 inputs of A/V media streams received from remote inputs, such as camera 102 and video server 104, for example. In some aspects, production switcher 108 may receive an input A/V media stream from remote camera 102 and route the input A/V media stream to distribution node 127 for live broadcast content such as a for live news coverage.

Storage 110 is configured to store digital media content. That is, in an aspect, storage 110 may be a hard disk (e.g., magnetic drive), flash memory, EEPROM, and the like configure to receive and store media content. For example, in some instances, remote camera 102 (or video server 104) may pre-record or otherwise obtain/provide media content (e.g., pre-recorded news/interview) to storage 110 for later processing and consumption.

Signal processor 111 may perform various corrections to the video signals. For instance, in an exemplary aspect, controller 113 may instruct the signal processor 111 to color correction (e.g., tone, red eye correction) and gamma correction.

Controller 113 can also be configured to provide operator instructions to the components of the video production facility 101. In an aspect, controller 113 may be configured to direct certain media (e.g., audio and video) feed to a particular destination in the media processing network. For example, controller 113 can be configured to instruct the production switcher 108 to stream media content from remote camera 102 via Internet 103 to processing node 128 for consumer consumption.

In an exemplary aspect, the transceiver 114 (which separately can be a receiver and transmitter according to variations of the exemplary aspect, can be configured to receive the media streams including the plurality of data packets from camera 102 and/or video server 104. In on refinement of the exemplary aspect, the transceiver 114 may be configured process layer 7 (L7 of the OSI protocol stack typically contains the media payload) signals encoded by encoder 116. For example, in an aspect, transceiver 114 may process L7 signals for transmission over IP (L3 of the OSI protocol stack) for consumer device distribution (e.g., cable TV, RF transmission, satellite TV, etc.) and for receiving L7 signals from the consumer device network.

Encoder 116 is configured to perform encoding of video and audio data into data packets for transmission over IP in the media processing network. In some examples, encoder 116 may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

According to the exemplary aspect, the media content synchronizer 115 is configured to generate a timeline to align and synchronize media content on a frame by frame basis to audio content using timestamps and is further configured to drop or repeat frames based on the identified timestamps. The details of this process will be described below. In an exemplary aspect, the media content synchronizer 115 can be a standalone device or alternatively be included in one or more of the other devices of the video production facility 101, including the production switcher 108, the signal processor 111, or the controller 113, for example.

In general, broadcasting across IP protocols uses a number of techniques developed to manage the frequency and phase sync. For example, precision time protocol (PTP) is a protocol that synchronizes clocks throughout a computer network, in which the media content (e.g., A/V data) is encoded with one or more time markers that are indexed to PTP timestamps used as a time reference for the computer network. PTP enables precise synchronization of clocks over a data packet network. PTP is defined in the IEEE-1588-2008 standard entitled "Standard for a Precision Clock Synchronization Protocol for Networked Measurement and Control Systems," which is hereby incorporated by reference. Simply put, PTP is used to distribute a "grandmaster" clock's precise time-of-day to slave clocks, such as the internal clock, used to drive frequency and control synchronization through the exchange of PTP packet timestamps.

Moreover, in some existing infrastructures, media production environments will use presentation timestamps (PTS) to synchronize a program's separate elementary streams (e.g., video, audio, subtitles and the like) when the program is presented to the viewer. The PTS is a timestamp metadata field that can be included in an MPEG transport stream or MPEG program stream, for example, that is given in units related to a program's overall clock reference, either program clock reference (PCR) or system clock reference (SCR), which is also transmitted in the transport stream or program stream. Thus, when no frames are dropped (e.g., lost packets), existing systems will constantly increase by fixed increments for every frame the media streams, which can be aligned using their PTS values.

In another example, when the video content is compressed using the H.264 standard as described above, the PTS value is derived from real-time transport protocol ("RTP") header information included in the compressed video data. In particular, the received IP media streams (e.g., captured and generated by the remote camera 102 or provided by video server 104) will include RTP header information for each data packet in the IP media stream. As is known to those skilled in the art, the RTP packet header of each data packet will include a 32-bit synchronization time stamp (i.e., a "RTP time stamp"). In all compressed RTP formats (e.g., plain compressed RTP, streaming, WebRTC and the like), the RTP timestamps of the RTP packets can be used to flag the PTS values to the decoders only on I-frames (i.e., frame types or picture types) since these frames are not reordered by the decoding process. As a result, the decoder tags non-IDR frames when it outputs PTS values as if the stream was in constant frame rate, with a constant time increment from last received timestamp.

According to an exemplary aspect, the video production facility 101 includes decoder 112 that is configured to receive the encoded IP media streams from camera 102 and/or video server 104 and flag the RTP timestamp as PTS values on every frame. In particular, the decoder 112 can be configured to inspect the RTP header and parse the time stamp of each received packet. Moreover, in an exemplary aspect, the system 100 employs the WebRTC (Web Real-Time Communication) specification/framework that provides web browsers with real-time communication (RTC). Advantageously, the WebRTC specification excludes any B-frames (i.e., frame types or picture types. While B-frames can use both previous and forward frames for data reference to get the highest amount of data compression, B-frames also enable the reordering of frames. Because the WebRTC specification excludes B-frames from the transmitted media streams, no reordering of the frames in the streams can occur. As a result, the received media streams are configured for correct timestamp matching on both sides of the decoder 112.

Thus, according to the exemplary aspect, the decoder 112 of the video production facility 101 is configured to decode the received media streams and pass the PTS value of each received frame to the media content synchronizer 115. In turn, the media content synchronizer 115 is configured to build a timeline for the media content production. By carrying the PTS information through the decoder 112, the media content synchronizer 115 is configured to analyze the PTS value of each frame in the media stream as the time each frame was captured by remote camera 102, for example. Moreover, by using the WebRTC specification, the media content synchronizer 115 is configured to analyze the PTS value for each frame on the premise that there can be no reordering of frames as described above. As a result, based on the PTS value, the media content synchronizer 115 is configured to determine whether a frame (e.g., data packet) has been dropped (or in some instances added) during transmission from remote camera 102, for example, to the video production facility 101. In other words, the media content synchronizer 115 is configured to identify the latest available frames for a fixed time that it expects and will fill in any gape (by repeating frames, for example).

As described above, the PTS timestamp value is given in units related to a program's overall clock reference. For example, using the compressed RTP protocol (which WebRTC is using), the RTP timestamp values use the same reference for all streams (e.g., video and audio essence) from the same source (e.g., remote camera 102 and/or video server 104). As a result, the RTP timestamp values can be used to synchronize the different essences together as described in detail below. In general, the media content synchronizer 115 is configured to synchronize the streams together and convert to the clock of the system (which is NTP locked) so that the clock is compatible with the rest of the media production system controlled by video production facility 101.

As described above, the PTS timestamp value is given in units related to a program's overall clock reference, which can be either program clock reference (PCR) or system clock reference (SCR), for example. According to an exemplary aspect, the media content synchronizer 115 is configured to generate a cadence for the media content using the received PCR or SCR that is transmitted in the transport stream of the media content, for example. The cadence can be used for a sequence of events (e.g., frames for the media content), with a monotonic increase count, where the interval between counts can be a time varying function. In other words, the reference clock can be used as the basis for the monotonic increasing count of the cadence, but the media content synchronizer 115 can also be configured to change that interval between counts as long as it is consistently applied to a received media stream.

Thus, according to an exemplary aspect, the cadence can be generated based on a universal time stamp (e.g., PTP time stamp) that synchronizes clocks throughout the media distribution network to drive frequency and control synchronization for the PTS values of each video frame. More particularly, the media content synchronizer 115 can be configured to decode each data packet to extract a time reference marker that is indexed to a real-time based time stamp. In exemplary aspects, this universal timestamp can be a PTP timestamp or any similar atomic referenced time stamp (e.g., NTP, PTP, etc.) that can be used to set the cadence for the timeline. That is, the media content synchronizer 115 can be configured to set the cadence to be a monotonic increase count with the intervals between counts being locked based on the timing of the universal timestamp of received and decoded packets.

Based on the determined cadence for the media streams, the media content synchronizer 115 is configured to generate a timeline for the video stream that matches the expected PTS value for each received frame to the cadence. For example, each frame of a received media stream may have a PTS value. Using these respective PTS values, the media content synchronizer 115 is configured to generate a timeline for the received media stream(s) that synchronizes the PTS values to the monotonic increasing count of the cadence. In other words, the PTS values (based on the stream not being generated at a constant rate) are not monotonically increasing, but then synchronized to a sequence of frame indexes, including, for example, "n" for a first frame, "n+1" for a second frame, "n+2" for a third frame and so forth.

In addition, an audio stream that corresponds to the video stream will have a fixed sampling rate (e.g., 48 kHz audio), but this sample rate will not necessarily match the same clock (i.e., the cadence) of the media content synchronizer 115. As a result, the media content synchronizer 115 is configured to perform a resampling of the audio stream so that the rates between the audio stream and video stream will match one another. In other words, because the clocks for each stream are not necessarily the same, they could drift from one another (and this drift will not necessarily be constant) so the media content synchronizer 115 is configured to perform a resampling of the audio stream. However, since the audio sampling rate is fixed, the media content synchronizer 115 will know that there is always to be 480 samples in a 10 ms window (at 48 kHz audio) and thus the difference is essentially the pace they are being played at depending on the reference clock.

The resulting media streams for both the audio and video content that can be associated with the same timeline at the same cadence defined by the media content synchronizer 115 can then be stored in storage 110 before processing, production and distribution (e.g., broadcast or multicast) using the other components of the video production facility as described above.

Because the WebRTC specification does not allow for the reordering of frames, the media content synchronizer 115 is configured to determine whether a packet (e.g., a frame) was dropped or otherwise lost during transmission from remote camera 102 and/or remote video server 104 based on the premise. In other words, if the sequence of received frames that are provided to the media content synchronizer 115 includes frame index values with "n", "n+1", "n+2", "n+5", "n+6" and so forth, the media content synchronizer 115 is configured to determine that the expected frames having index values of "n+3" and "n+4" were lost during transmission, and not simply out of order since the WebRTC specification does not provide for packet reordering.

In order to compensate for the missing packets and to maintain alignment, synchronization and timing of the received media streams, the media content synchronizer 115 is configured to repeat (or drop frames) based on the timestamp values that can be placed in the media stream timeline. Therefore, if the media content synchronizer 115 determines that the frames having index values of "n+3" and "n+4" have been lost or otherwise missing, the media content synchronizer 115 is configured to generate the media content timeline by repeating the frame "n+2" for the next two counts in the sequence for the timeline.

Figure 3A:
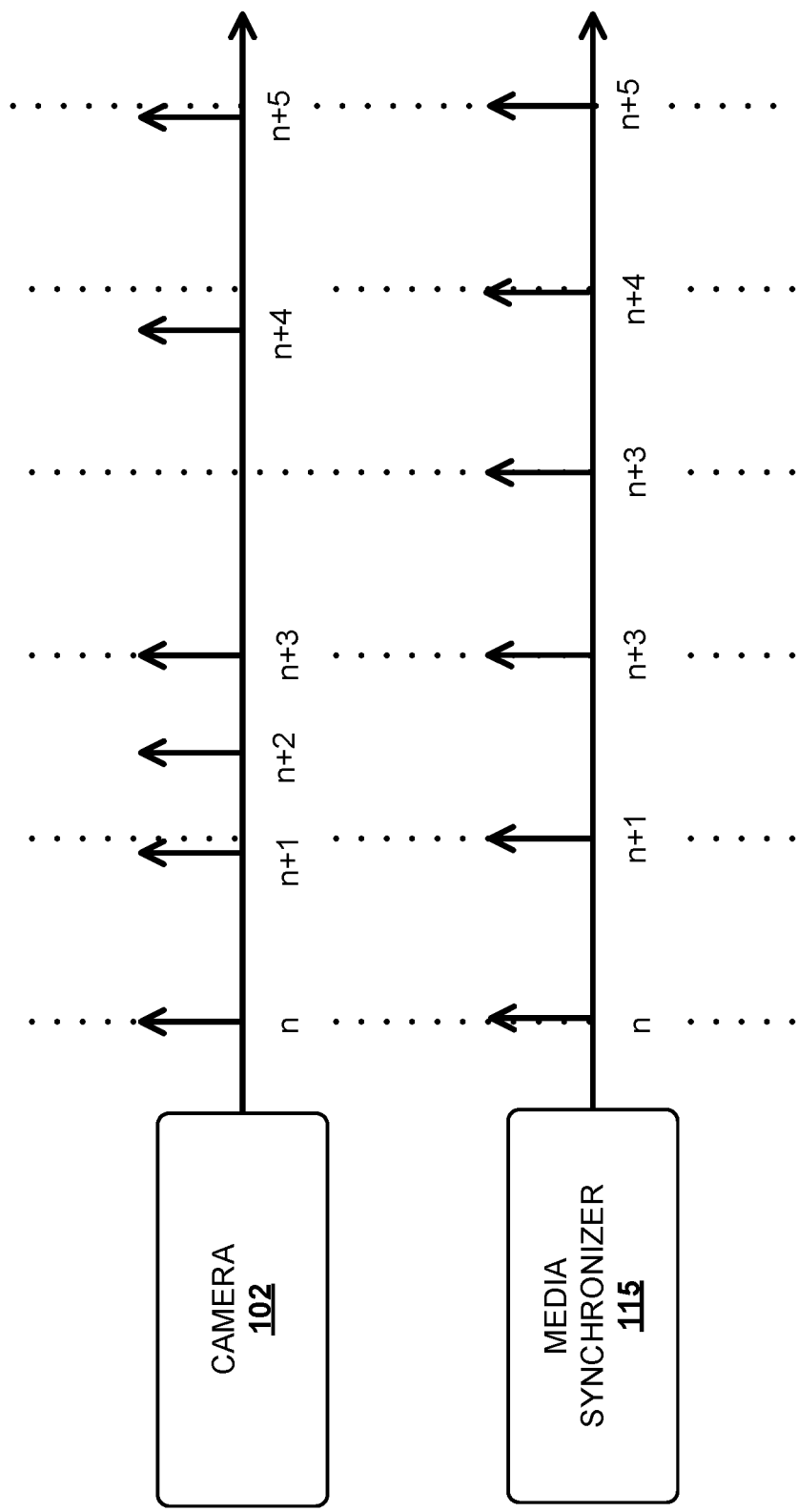
FIGS. 3A and 3B illustrates timing diagrams for generating a media stream timeline for synchronizing the transmission of content in a network using timestamps according to an exemplary embodiment.
Figure 3B:
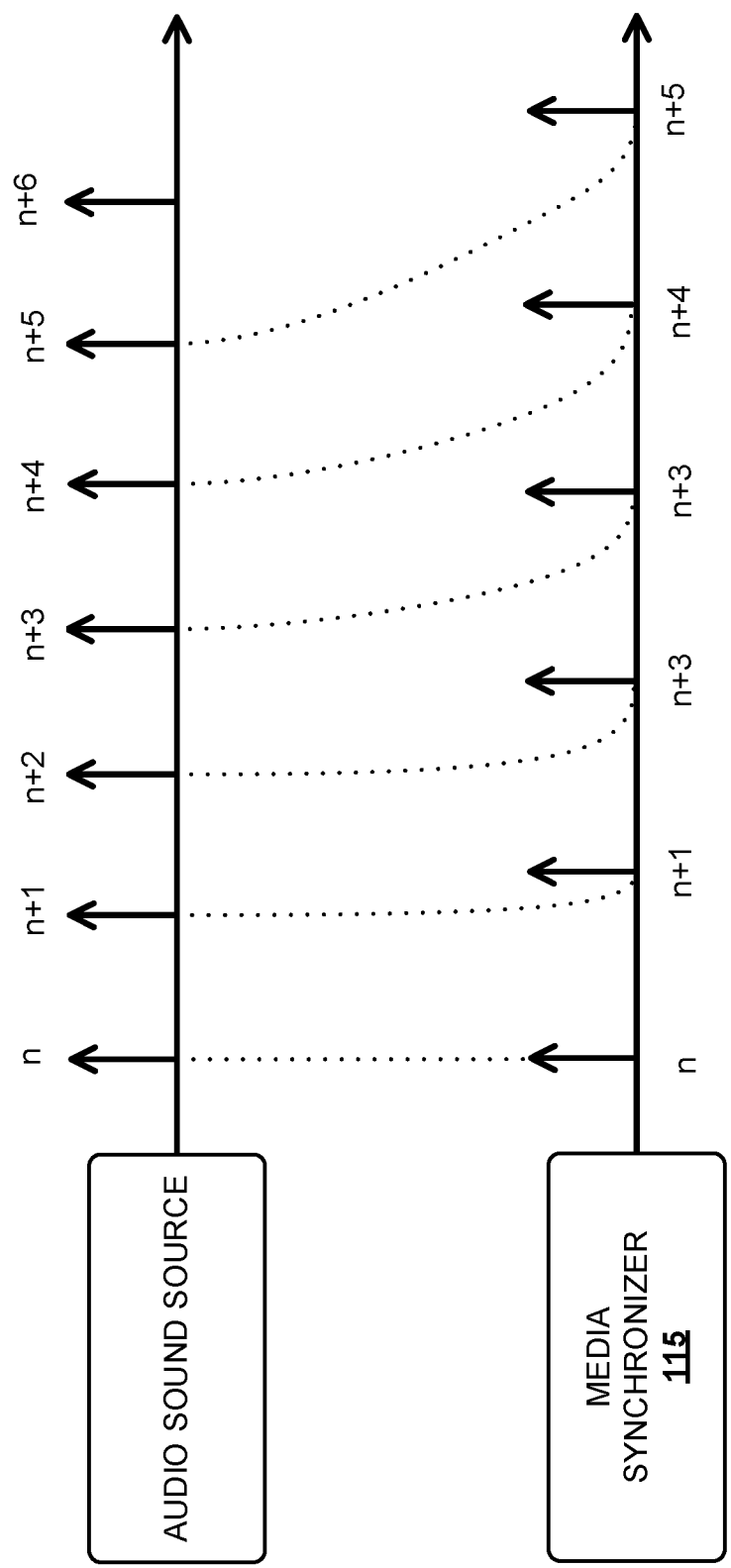

FIGS. 3A and 3B illustrate timing diagrams for generating a media stream timeline for synchronizing the transmission of media content in a network using timestamps according to an exemplary embodiment. As shown in FIG. 3A, the remote camera 102 is configured to generate and transmit a compressed video stream, as described above, in which the frames of the media stream are generated when captured and can be done so at a variable frame rate, for example. The video media stream generated by remote camera 102 shows frames with PTS values corresponding to "n", "n+1", "n+2", "n+3", "n+4" and "n+5" frame indexes, but not at a constant rate.

As further described above, decoder 112 is configured to receive the media stream transmitted from camera 102 and to parse the RTP packets of the received media stream to determine that frames with PTS values of each frame. That is, the decoder 112 is configured to decode the IP packets of the media streams and provide the PTS values of the received frames to the media content synchronizer 115.

In response, the media content synchronizer 115 is configured to build a timeline for the media stream according to the cadence as also described above. In this example, the cadence is shown with the dashed lines and includes a monotonic increase count (e.g., at a constant interval) as also described above. Using the PTS values provided by the decoder, the media content synchronizer 115 is configured to build the media content timeline that includes frames with PTS values based on the expected value based on the cadence. As shown, the media content synchronizer 115 identifies frame "n" at the first count of the cadence and frame "n+1" at the second cadence count. However, at the third count, the media content synchronizer 115 identifies frame "n+3", and, therefore, is configured to drop the frame "n+2" to synchronize the media content timeline. Moreover, at the fourth cadence count, there is no corresponding frame so the media content synchronizer 115 is configured to repeat frame "n+3" for back to back counts in the cadence timeline.

FIG. 3B illustrates a timing diagram for synchronizing the audio essence with the video essence. As noted above, the audio sampling rate is fixed. As a result, the media content synchronizer 115 knows that there is always to be 480 samples in a 10 ms window (at 48 kHz audio). Thus, the media content synchronizer 115 is configured to resample the audio content to match the audio samples to the same cadence as the video essence. As shown, the audio sound source is sampled at a rate slightly higher than the cadence and thus the media content synchronizer 115 resamples to pace the audio essence to the same cadence timeline. It should be appreciated that while the example shows the audio sound source sampled at a slightly higher rate, it may be necessary to sample the audio sound source at a slightly lower rate depending on the clocks as would be appreciated to one skilled in the art. In either case, because the media content synchronizer 115 uses the same clock on both video and audio essences, the media content synchronizer 115 is configured to generate a timeline with a constant frame rate signal based on the cadence that has lip sync with the two streams being synchronized.

Advantageously, the production switcher 108 can be configured to align audio and video streams for media production. By repeating (or dropping) frames to generate the synchronized timeline at a constant rate and to account for lost IP packets, the media content synchronizer 115 is configured achieve synchronized lip sync, whereas lost video packets over an extended period of time would otherwise lead to significant shift between the two essences and lip sync misalignment using conventional systems.

Figure 4:
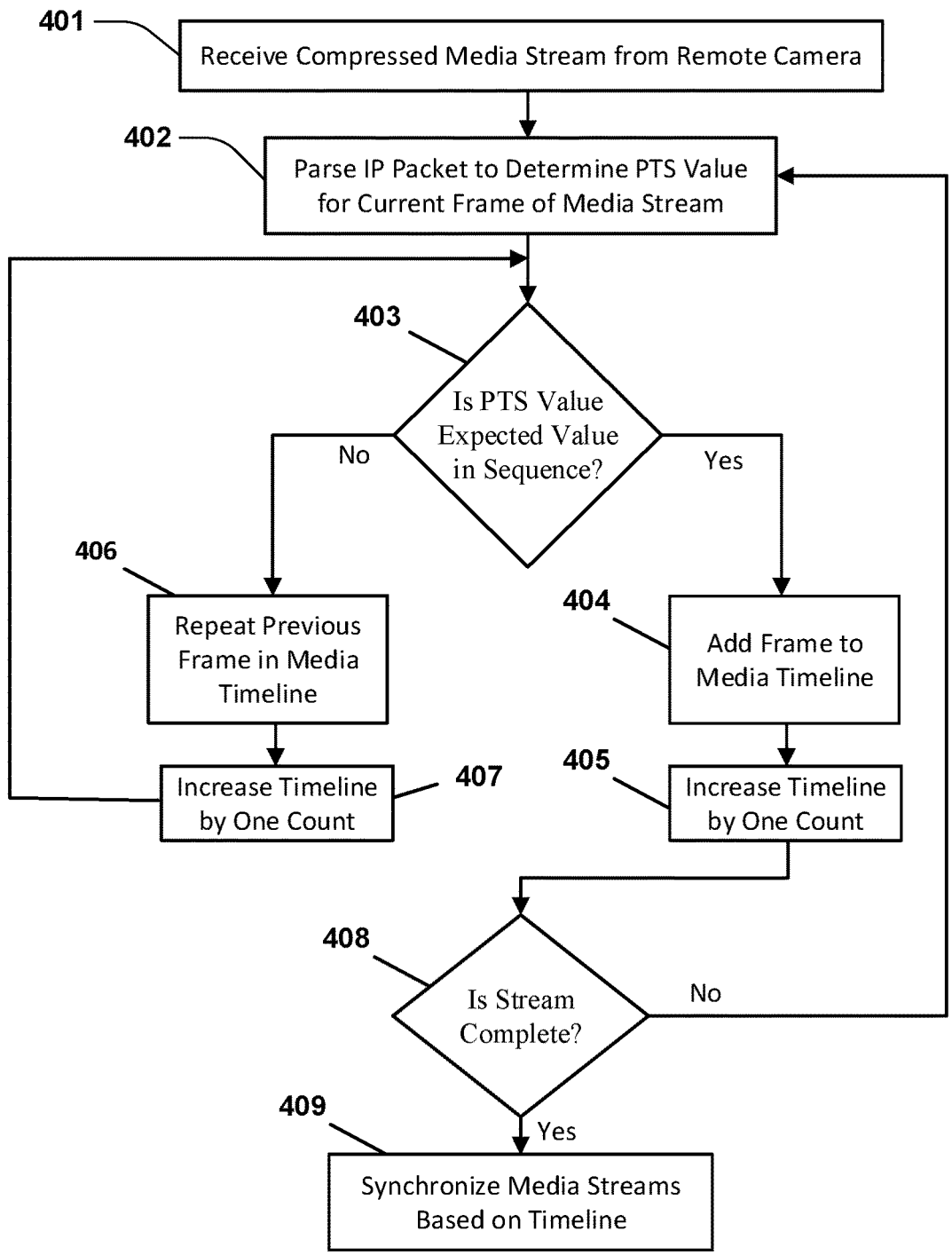
FIG. 4 illustrates a flowchart of a method for synchronizing the transmission of media content in a network using timestamps according to an exemplary embodiment.

FIG. 4 illustrates a flowchart of a method for synchronizing the transmission of media content in a network using timestamps according to an exemplary embodiment. In general, it should be appreciated that the exemplary method 400 can be implemented using the components and systems described above, including the video production facility 101 and the content synchronizer 115.

As shown, initially at step 401, the video production facility 101 receives a compressed media stream of video content from a remote content generating device, such as remote camera 102, for example. Next, at step 402, the decoder 112 of the video production facility 101 is configured to parse each IP packet of the media stream to identify the RTP packet and determine the PTS value for the current frame of the media stream.

At step 403, the media content synchronizer 115 is configured to determine whether the current frame is the expected frame in the sequence of IP packets based on the PTS value. As noted above, the content synchronizer 115 is configured to do so based on a monotonic count of a cadence for a media content timeline. If the current frame is the next frame in the sequence (i.e., a "YES" in response to step 403), the media content synchronizer 115 is configured to add the current frame to the timeline at step 404 and the count sequence for the timeline is increased on one count based on the cadence at step 405.

Otherwise, if the frame is not the next frame in the sequence (i.e., a "NO" in response to step 403), the media content synchronizer 115 is configured to repeat the previous frame at step 406 as described above. Then at step 407, the media content synchronizer 115 is again configured to increase the count sequence for the timeline by a one count based on the cadence. The method then returns to step 403 to again determine whether the current frame is the next frame in the count sequence based on the PTS value. This process is continuously repeated with steps 403, 406 and 407 until the current frame is the next frame in the sequence at which point the method again proceeds to step 404 as described above.

After the media content synchronizer 115 increases the count sequence for the timeline by a one count based on the cadence at step 405, the method proceeds to step 408 to determine whether every packet in the media stream received by the video production facility 101 has been parsed and added to the timeline. If "NO" at step 408, the method returns to step 402 to continue the process of generating the timeline for the video essence. Otherwise, if "YES" at step 409, the timeline for the media content is complete and the method proceeds to step 409.

At this point, the media streams can be synchronized for media production. As noted above, the media content synchronizer 115 is configured to resample the corresponding audio essence to generate a matching rate for each essence, i.e., on the media content timeline. As a result, the received video content can be aligned with audio content using the generated media timeline, which defines a constant (and the same) rate for each stream.

Once the streams are synchronized, the media content can then be distributed to content consuming devices (e.g., devices 117A and 117B) by production switcher 108, for example. However, it is also noted that the media content synchronizer 115 could be implemented directly on the end-user content consuming devices (e.g., devices 117A and 117B). In this example, the media streams are transmitted directly to the content consuming device at the original rates, wherein the separate audio and video essences can be synchronized remotely at these devices using the same methods and techniques described above.

Figure 5:
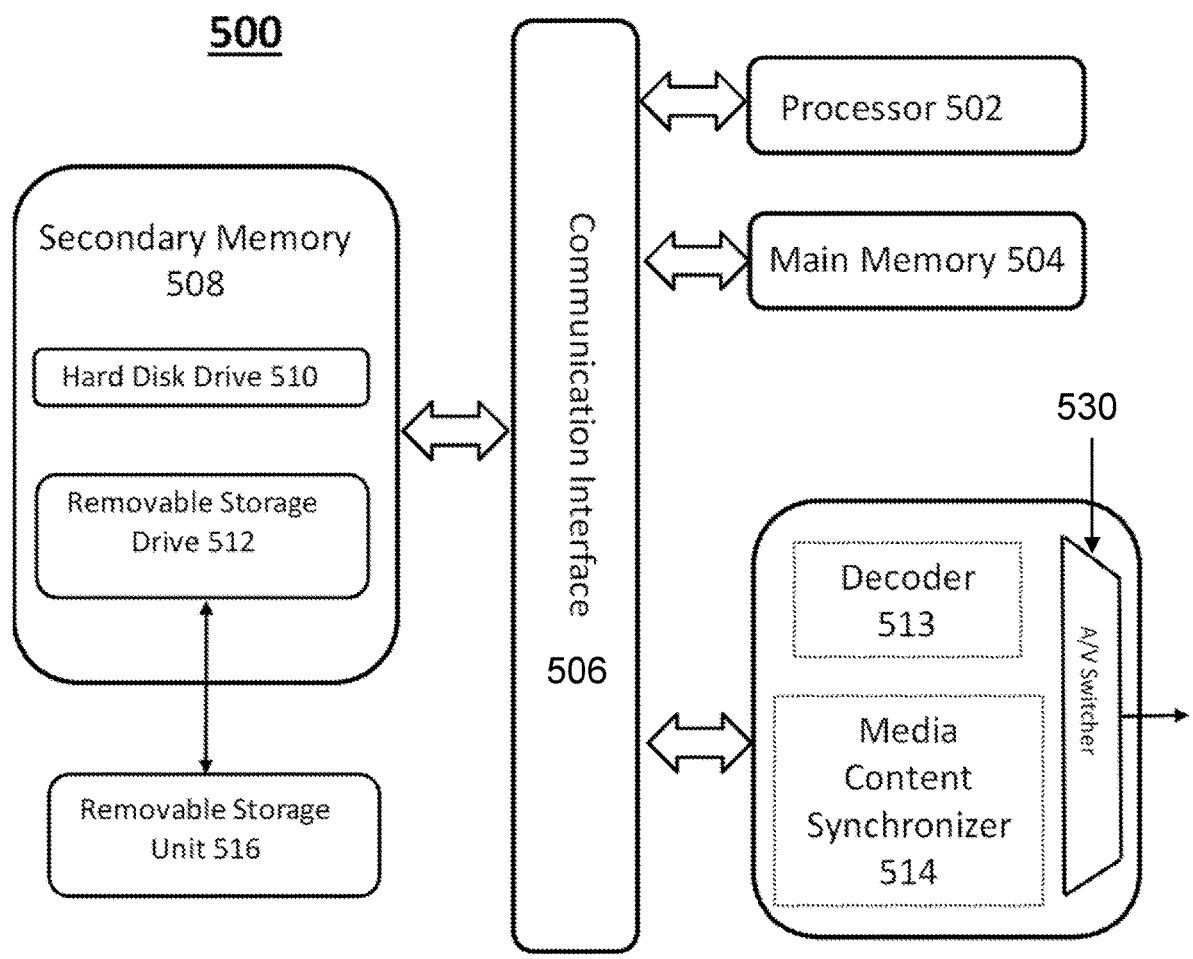
FIG. 5 illustrates an example system diagram of various hardware components and other features, for use in accordance with aspects presented herein.

FIG. 5 illustrates an example system diagram of various hardware components and other features, for use with the video production facility 101 in accordance with an exemplary aspect disclosed herein. Aspects presented herein may be implemented using hardware, software, or a combination thereof and may be implemented in one or more computer systems or other processing systems. Aspects include one or more computer systems 500 capable of carrying out the functionality described herein.

As shown, computer system 500 includes one or more processors, such as processor 502, which can correspond to one or more of the controller 113 and/or signal processor 11 in one embodiment, for example. The processor 502 is connected to a communication infrastructure 506 (e.g., a communications bus, cross-over bar, or network). Various software implementations are described in terms of this example computer system.

By way of example, an element, or any portion of an element, or any combination of elements may be implemented with a "processing system" that includes one or more processors. The processing system further includes one or more modules for executed the algorithms described herein. The modules may be software modules running in the processor 502, resident/stored in memory 508, e.g., a computer readable medium, one or more hardware modules coupled to the processor 502, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Computer system 500 also includes a main memory 504, preferably random access memory (RAM), and may also include a secondary memory 508. The main memory can correspond to storage 110 in an exemplary aspect. Moreover, the secondary memory 508 may include, for example, a hard disk drive 510 and/or a removable storage drive 512, representing a floppy disk drive, a magnetic tape drive, an optical disk drive, etc. The removable storage drive 512 reads from and/or writes to a removable storage unit 516 in a well-known manner. Removable storage unit 516, represents a floppy disk, magnetic tape, optical disk, etc., which is read by and written to removable storage drive 512. As will be appreciated, the removable storage unit 516 includes a computer usable storage medium having stored therein computer software and/or data.

In alternative implementations, secondary memory 508 may include other similar devices for allowing computer programs or other instructions to be loaded into computer system 500. Examples of such may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 508 to computer system 500. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Computer programs (also referred to as computer control logic) are stored in main memory 504 and/or secondary memory 508. Such computer programs, when executed, enable the computer system 500 to perform the features of the aspects discussed herein. In particular, the computer programs, when executed, enable the processor 502 to perform the features of the presented herein. Accordingly, such computer programs represent controllers of the computer system 500.

If implemented in software, the functions may be stored on or encoded as one or more instructions or code on a computer-readable medium. Computer-readable media includes computer storage media. Thus, when aspects are the implemented using software, the software may be stored in a computer program product and loaded into computer system 500 using removable storage drive 512, or hard drive 510, for example. The control logic (software), when executed by the processor 502, causes the processor 502 to perform the functions as described herein. In another example implementation, aspects may be implemented primarily in hardware using, for example, hardware components, such as application specific integrated circuits (ASICs). Implementation of the hardware state machine so as to perform the functions described herein will be apparent to persons skilled in the relevant art(s).

As further shown, the system 500 can include decoder 513 (corresponding to decoder 112), media content synchronizer 514 (corresponding to media content synchronizer 115) and A/V switcher (corresponding to video production switcher 108), for example. As should be appreciated to those skilled in the art, the system 500 is configured to use these components to synchronize the transmission of audio and media content in a media product network using timestamps, as described above, according to an exemplary embodiment.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for synchronizing media content for a media production, the system comprising:
   a receiver configured to receive an IP media stream comprising a plurality of video frames;
   a decoder configured to parse the IP media stream to determine a timestamp value for each video frame of the plurality of video frames; and
   a media content synchronizer configured to generate a media content timeline for the media production based on the determined timestamp value of each of the plurality of video frames;
   wherein the media content synchronizer is configured to generate the media content timeline based on a cadence having a monotonic increasing count;
   wherein the media content synchronizer is configured to determine whether each of the plurality of video frames of the IP media stream is a next frame in a video sequence of the IP media stream based on the determined timestamp value for the respective video frame;
   wherein the media content synchronizer is configured to provide a substitute frame in the video sequence to generate the media content timeline when the media content synchronizer determines that a current frame in the video sequence was dropped based on the determined timestamp value for each of the plurality of video frames when the IP media stream was transmitted in a media distribution network to the receiver.

2. The system according to claim 1, further comprising a production switcher configured to generate the media production by synchronizing the plurality of video frames of the IP media stream with corresponding audio content based on the generated media content timeline.

3. The system according to claim 2, wherein the media content synchronizer is configured to resample the corresponding audio content at a rate to be synchronized to the cadence of the media content timeline, such that the corresponding audio content is aligned with the video sequence.

4. The system according to claim 2, wherein the production switcher is configured to generate the media production to be displayed on a browser of a content consuming device according to a Web Real-Time Communication (WebRTC) framework, such that B-frames are excluded from the plurality of video frames and the plurality of video frames of the IP media stream cannot be reordered when transmitted in the media distribution network.

5. The system according to claim 4, wherein the content consuming device comprises the media content synchronizer.

6. The system according to claim 1, wherein the media content synchronizer generates the media content timeline based on the cadence having the monotonic increasing count that is derived from a time reference of the media distribution network.

7. The system according to claim 1, wherein the media content synchronizer is configured to repeat a previous frame in the video sequence as the substitute frame in the video sequence.

8. The system according to claim 1, wherein the IP media stream further comprises real-time transport protocol ("RTP") header information, and the decoder parses each of a plurality of IP packets of the IP media stream to determine the timestamp value for each of the plurality of video frames from an RTP packet parsed from the RTP header information.

9. The system according to claim 1, wherein the media content synchronizer is configured to determine that a frame in the video sequence has been added based on the determined timestamp value for each of the plurality of video frames.

10. The system according to claim 1, wherein the media content synchronizer is configured to generate the cadence based on a reference clock of the media distribution network, and the cadence is generated based on a universal timestamp that synchronizes clocks throughout the media distribution network to drive frequency and control synchronization for the determined timestamp value of each of the plurality of video frames.

11. A system for synchronizing media content for a media production, the system comprising:
a decoder configured to parse an IP media stream to determine a timestamp value for each of a plurality of video frames in the IP media stream; and
a media content synchronizer configured to:
generate a media content timeline based on the determined timestamp value of each of the plurality of video frames in the IP media stream and according to a cadence having a monotonic increasing count,
determine whether each of the plurality of video frames of the IP media stream is a next frame in a video sequence of the IP media stream based on the determined timestamp value for each of the plurality of video frames of the IP media stream, and
provide a substitute frame in the video sequence to generate the media content timeline when a current frame in the video sequence was determined to have been dropped based on the determined timestamp value.

12. The system according to claim 11, wherein the media content synchronizer repeat a previous frame in the video sequence as the substitute frame to generate the media content timeline.

13. The system according to claim 11, further comprising a production switcher configured to generate the media production by synchronizing the plurality of video frames of the IP media stream with corresponding audio content based on the generated media content timeline.

14. The system according to claim 13, wherein the media content synchronizer is further configured to resample the corresponding audio content at a rate to be synchronized to the cadence of the media content timeline, such that the corresponding audio content is aligned with the video sequence.

15. The system according to claim 13, wherein the production switcher is configured to generate the media production to be displayed on a browser of a content consuming device according to a Web Real-Time Communication (WebRTC) framework, such that B-frames are excluded from the plurality of video frames and the plurality of video frames of the IP media stream cannot be reordered when transmitted in a media distribution network.

16. The system according to claim 11, wherein the decoder is further configured to parse a plurality of IP packets of the IP media stream to determine the timestamp value for each of the plurality of video frames.

17. The system according to claim 16, wherein the IP media stream further comprises real-time transport protocol ("RTP") header information, and the decoder parses each of the plurality of IP packets of the IP media stream to determine the timestamp value for each of the plurality of video frames from an RTP packet parsed from the RTP header information.

18. The system according to claim 17, wherein the media content synchronizer is further configured to determine that a frame in the video sequence has been added based on the determined timestamp value for each of the plurality of video frames.

19. The system according to claim 11,
wherein the media content synchronizer is further configured to generate the cadence based on a reference clock of a media distribution network on which the IP media stream is transmitted, and
wherein the cadence is generated based on a universal timestamp that synchronizes clocks throughout the media distribution network to drive frequency and control synchronization for the determined timestamp value of each of the plurality of video frames.

20. A system for synchronizing media content for a media production, the system comprising:
means for parsing an IP media stream to determine a timestamp value for each of a plurality of video frames in the IP media stream;
means for generating a media content timeline based on the determined timestamp value of each of the plurality of video frames in the IP media stream and according to a cadence having the monotonic increasing count;
means for determining whether each of the plurality of video frames of the IP media stream is a next frame in a video sequence of the IP media stream based on the determined timestamp value for each of the plurality of video frames of the IP media stream; and
means for providing a substitute frame in the video sequence to generate the media content timeline when a current frame in the video sequence was determined to have been dropped based on the determined timestamp value.

* * * * *